(12) United States Patent
Fan (10) Patent No.: US 8,059,892 B1
(45) Date of Patent: Nov. 15, 2011

(54) IMAGE ENHANCEMENT METHOD AND APPARATUS

(75) Inventor: Jian Fan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 685 days.

(21) Appl. No.: 12/243,793

(22) Filed: Oct. 1, 2008

(51) Int. Cl.
*G06K 9/00* (2006.01)
(52) U.S. Cl. ........................................ 382/167; 382/173
(58) Field of Classification Search .......... 382/162–167, 382/173, 274–275, 254; 358/1.2, 1.9, 3.26–3.27, 358/515–523; 348/223.1
See application file for complete search history.

(56) References Cited

U.S. PATENT DOCUMENTS

| | | | |
|---|---|---|---|
| 5,710,830 A * | 1/1998 | Holeva | 382/173 |
| 6,766,055 B2 | 7/2004 | Matsugu et al. | |
| 7,254,270 B2 | 8/2007 | Simske | |
| 7,394,931 B2 | 7/2008 | Shimizu | |
| 7,495,696 B2 * | 2/2009 | Chikane et al. | 348/223.1 |
| 7,652,795 B2 * | 1/2010 | Couwenhoven et al. | 358/3.26 |
| 2006/0039690 A1 | 2/2006 | Steinberg et al. | |
| 2010/0246951 A1 * | 9/2010 | Chen et al. | 382/167 |

* cited by examiner

*Primary Examiner* — Ishrat I Sherali (57) ABSTRACT

An image enhancement method includes segmenting pixels of an image into background pixels and non-background pixels and computing a color scaling factor based on the color of the background pixels compared to white. The color scaling factor is then applied to the background pixels and the non-background pixels.

20 Claims, 8 Drawing Sheets

| 14 | 12 | 10 | 8 |
|----|----|----|---|
| 16 | 10 | 8  | 6 |
| 18 | 8  | 6  | 4 |
| 0  | 6  | 4  | 2 |

↙ 44

| B2 | B2 | B2 | B2 |
|----|----|----|----|
| B2 | B2 | B2 | B2 |
| W  | B2 | B2 | B2 |
| B1 | W  | B2 | B2 |

IMAGE ENHANCEMENT METHOD AND APPARATUS

CROSS-REFERENCE TO RELATED APPLICATION

This application is related to and commonly-assigned U.S. patent application Ser. No. 11/741,188, which is incorporated by reference.

BACKGROUND

Digital cameras provide a quick and convenient way to capture images of documents such as business cards, presentations, white boards, posters, book pages, etc. Using a camera for digitizing a bound book further allows for a non-destructive capture of the book pages. Document capture with digital cameras, however, has inherent limitations. For instance, it can be difficult to project uniform lighting onto a document surface, and this can result in uneven illumination and color shift in the acquired images. Document aging also can cause color changes.

Moreover, captured documents sometimes do not have a uniform white background. In the case of book remastering, some pages have a uniform white background while other pages, such as the front and back covers, do not. This complicates global color-correction schemes for book pages.

For these and other reasons there is a need for the present invention.

SUMMARY

Embodiments of an image enhancement method, as well as an apparatus and a computer readable medium storing instructions causing a machine to implement the method, are disclosed. The disclosed method includes segmenting pixels of an image into background pixels and non-background pixels and computing a color scaling factor based on the color of the background pixels compared to white. The color scaling factor is then applied to the background pixels and the non-background pixels.

BRIEF DESCRIPTION OF THE DRAWINGS

FIG. 4 illustrates an example of an image that contains nonuniformly illuminated text.

FIG. 5 illustrates an example of an image that is composed of color gradient magnitude values that were derived from the image illustrated in FIG. 4.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
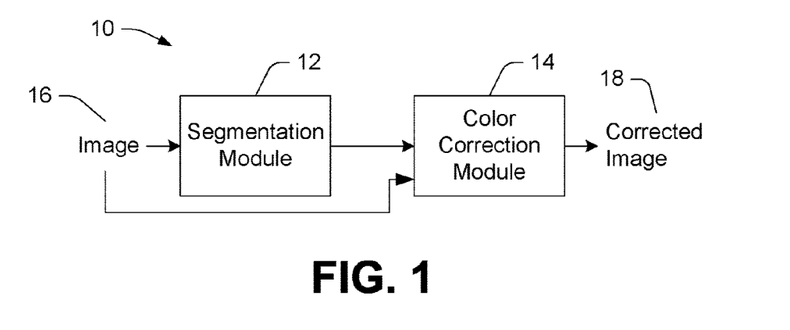
FIG. 1 is a block diagram conceptually illustrating an image processing system in accordance with embodiments of the present invention.

FIG. 1 is a block diagram conceptually illustrating an embodiment of an image processing system 10 that includes a segmentation module 12 and a color correction module 14. The system 10 receives an image 16 and the segmentation module 12 segments the pixels into background and non-background pixels, and then the color correction module outputs a corrected image 18 with the corrected colors.

Figure 2:
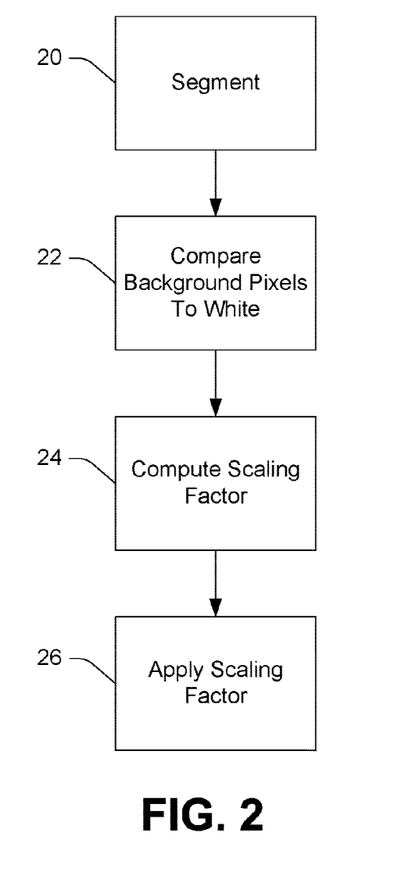
FIG. 2 is a flow diagram generally illustrating an image enhancement method in accordance with embodiments of the present invention.

FIG. 2 is a flow diagram generally illustrating a method executed by the system 10. As noted above, the segmentation module 12 segments the pixels of the image 16 into background pixels and non-background pixels in block 20. It is assumed that the original color of the image background is white. Thus, the color correction module 14 is operable to compare the color of the background pixels to white in block 22 and compute a color scaling factor based on the comparison in block 24. The color scaling factor is then applied to the background pixels and the non-background pixels in block 26, resulting in the color-corrected image 18.

Figure 3:
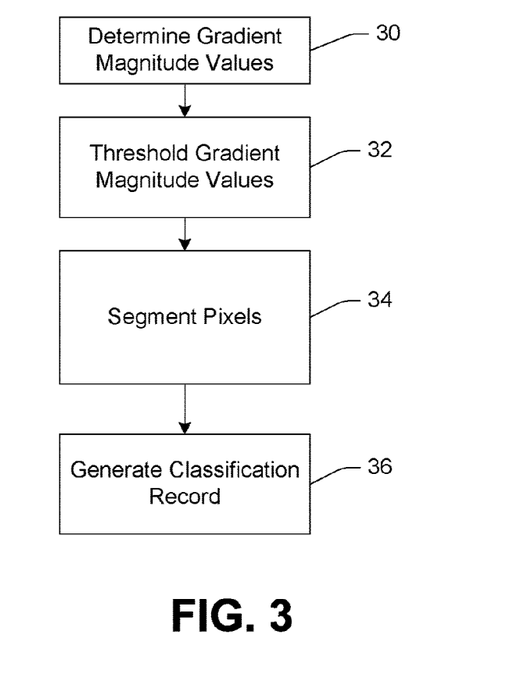
FIG. 3 is a flow diagram illustrating further aspects of an image processing method in accordance with embodiments of the present invention.

FIG. 3 illustrates further aspects of an embodiment of the segmentation process 20 implemented by the image processing system 10. The segmentation module determines gradient magnitude values at respective pixels of the image 16 in block 30. In block 32, the gradient magnitude values are thresholded with a global threshold to produce thresholded gradient magnitude values, and the pixels of the image 16 are segmented into groups in accordance with a watershed transform of the thresholded gradient magnitude values in block 34. In block 36, the segmentation module 12 generates a classification record that labels pixels as background pixels or non-background pixels.

In some embodiments, the pixel values of the image 16 are denoised before determining the gradient magnitude values. For this purpose, any type of denoising filter may be used, including a Gaussian smoothing filter and a bilateral smoothing filter. In other embodiments, gradient magnitude values are determined directly from pixel values of the image 16. In general, any type of gradient filter or operator may be used to determine the gradient magnitude values. The color image 16 can be converted into a YCrCb color image and apply a gradient filter such as, for example, a basic derivative filter, a Prewitt gradient filter, a Sobel gradient filter, a Gaussian gradient filter, or another type of morphological gradient filter to the luminance (Y) values to determine the gradient magnitudes. In some embodiments, the system 10 computes each of the gradient magnitude values from multiple color space components (for example, red, green, and blue components) of the color image. For example, in some of these embodiments, the system 10 determines the magnitudes of color gradients in the color image in accordance with the color gradient operator described in Silvano DiZenzo, "A Note on the Gradient of a Multi-Image," Computer Vision, Graphics, and Image Processing, vol. 33, pages 116-125 (1986).

FIG. 4 illustrates an example 40 of the image 16 that contains nonuniformly illuminated text. In the following detailed description, the exemplary image 40 and the various image data derived therefrom are used for illustrative purposes only to explain one or more aspects of one or more embodiments of the invention. FIG. 5 illustrates an example of an image 42 that is composed of color gradient magnitude values that were derived from the color image 40 illustrated in FIG. 4 in accordance with such a color gradient operator.

As explained above, the system 10 thresholds the gradient magnitude values with a global threshold to produce thresholded gradient magnitude values (FIG. 3, block 32). This global thresholding process eliminates or breaks noise structures in the images before performing the watershed transform based image segmentation. In this way, the problems of over-segmentation and inaccurate segmentation results due to such noise structures may be reduced. The segmentation module 12 typically uses an empirically determined global threshold to threshold the gradient magnitude values. In some embodiments, system 10 thresholds the gradient magnitude values with a global threshold ($\tau_{GLOBAL}$ that is determined in accordance with the following:

$$\tau_{GLOBAL} = \begin{cases} k \cdot g_{MAX} & \text{if } k \cdot g_{MAX} > \tau_{MIN} \\ \tau_{MIN} & \text{otherwise} \end{cases}$$

where k is a real number, $g_{MAX}$ is the maximum gradient magnitude value, and $\tau_{MIN}$ is an empirically determined minimum global threshold value. In one exemplary embodiment, the range of gradient magnitude values is from 0 to 255, k=0.1 and $\tau_{MIN}$=5. The resulting thresholded gradient magnitude values then used for segmentation processing.

In other embodiments, the global threshold $\tau_{GLOBAL}$ is determined by an alternative process. Assuming that background regions are smooth in terms of color and occupy a significant area of the image, the global threshold ($\tau_{GLOBAL}$) is determined using a gradient histogram as follows:

Determine the maximum value $g_{max}$ of the gradient magnitude g, by checking all the values of g. The minimum value of g is zero.

Compute a quantization interval $\Delta g = g_{max}/255$

Figure 6A:
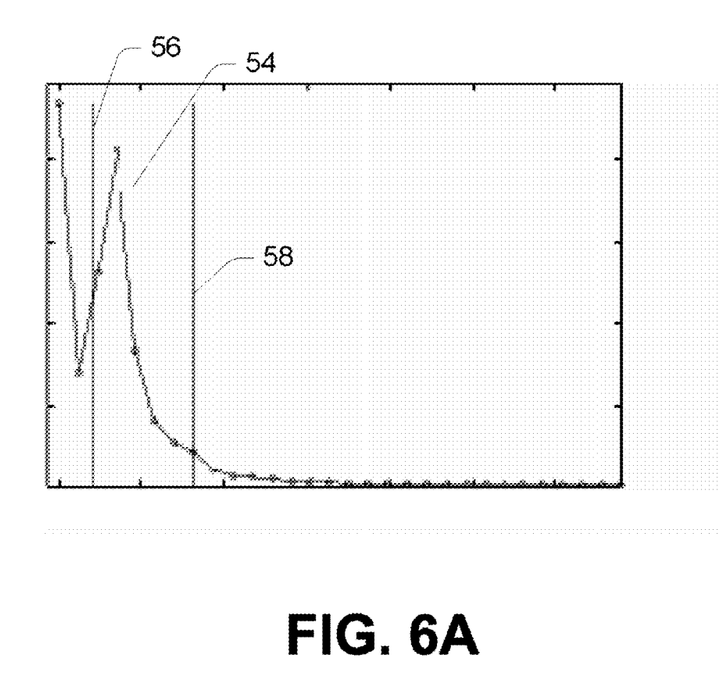
FIGS. 6A and 6B are charts illustrating examples of gradient magnitude calculations in accordance with embodiments of the present invention.
Figure 6B:
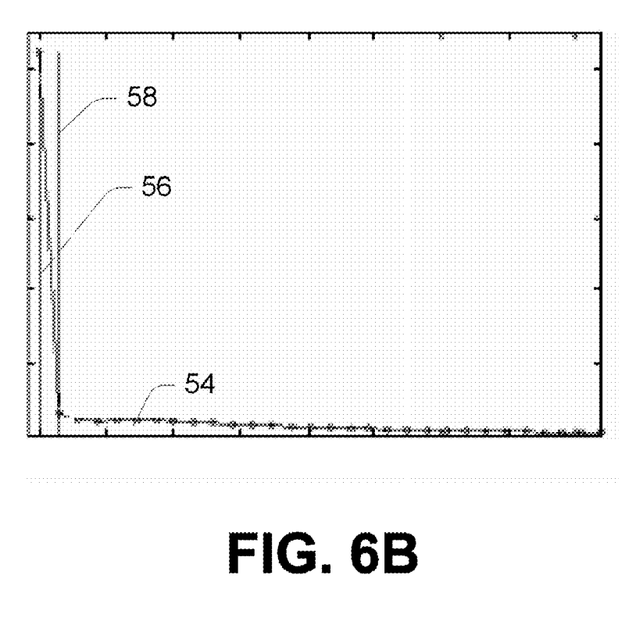

Compute the histogram of g:
    Set all elements of gh[256] to zero (gh[256] is an array of 256 integer elements);
    For each pixel location (i, j),
        compute index=$\lfloor g_{i,j}/\Delta g \rfloor$, where $\lfloor x \rfloor$ represents the largest integer that is smaller than x;
        increase gh[index] by one count.

compute the threshold $\tau_{GLOBAL}$
    gws=0;
    gw=0;
    $gh_{max}$=0;
    for i=0 to N
        if $gh_i > gh_{max}$
            $gh_{max}=gh_i$;
        End;
        if i==0
            w2=$|gh_i - gh_{i+1}|$
        else
            w2=$|2 \cdot gh_i - gh_{i+1} - gh_{i-1}|$
        end;
        gws=gws+$i \cdot \Delta g \cdot gh_i \cdot$w2;
        gw=gw+$gh_i \cdot$w2;
    end;
    $g_p$=gws/gw
    $i_p=\lceil g_p/\Delta g \rceil$
    $gh_{low}=k \cdot gh_{max}$;
    for i=$i_p$ to N
        if $gh_i < gh_{low}$ AND $gh_{i+1} < gh_{low}$ AND $gh_{i+2} < gh_{low}$
            break;
        end;
    end;
    $\tau_{GLOBAL} = \lambda \cdot i \cdot \Delta g$;

N, k and λ are parameters set by users, for example, N=30 and k=0.1 and λ=1.2 in some embodiments, The value $g_p$ is expected to correspond to the peak of the histogram gh. Two examples are shown in FIGS. 6A and 6B. The curve 54 is the gradient histogram gh. The lines 56 correspond to the value $g_p$ and the lines 58 correspond to $\tau_{GLOBAL}$ computed with N=30, k=0.1 and λ=1.

In the course of computing the watershed transform of the gradient magnitude values, the segmentation module 12 identifies basins and watersheds in the thresholded magnitude values, assigns respective basin labels to those pixels corresponding to ones of the identified basins, assigns a unique shared label to those pixels corresponding to the watersheds, and performs a connected components analysis on the assigned labels. The watershed transform may be computed in accordance with any one of a wide variety of different methods. In some embodiments, the basins are found first and the watersheds may be found by taking a set complement whereas, in other embodiments, the image is partitioned completely into basins and the watersheds may be found by boundary detection (see, for example, J. B. T. M. Roerdink et al., "The Watershed Transform: Definitions, Algorithms and Parallelization Strategies, Fundamenta Informaticae, vol. 41, pages 187-228 (2001)). In some embodiments, the watershed transform of the thresholded gradient magnitude values is computed in accordance with the watershed calculation method described in Luc Vincent et al., "Watersheds in Digital Spaces: An Efficient Algorithm Based on Immersion Simulations," IEEE Transactions on Pattern Analysis and Machine Intelligence, vol. 13, no. 6 (June 1991).

In general, the segmentation module 12 may perform any one of a wide variety of different connected components analyses on the assigned labels. For example, in one connected component labeling approach, the labels assigned to the pixels are examined, pixel-by-pixel in order to identify connected pixel regions (or "blobs", which are regions of adjacent pixels that are assigned the same label). For each given pixel, the label assigned to the given pixel is compared to the labels assigned to the neighboring pixels. The label assigned to the given pixel is changed or unchanged based on the labels assigned to the neighboring pixels. The number of neighbors examined and the rules for determining whether to keep the originally assigned label or to re-classify the given pixel depends on the measure of connectivity being used (for example, 4-connectivity or 8-connectivity).

Figure 7A:
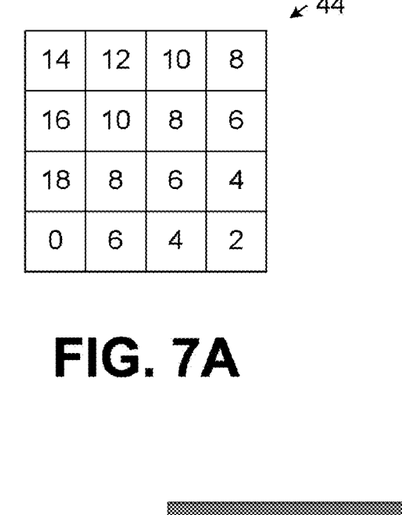
FIG. 7A is a diagrammatic view of an array of devised gradient magnitude values at respective pixels of an illustrative image.
Figure 7B:
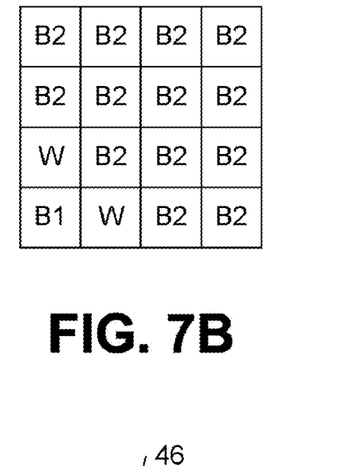
FIG. 7B is a diagrammatic view of an array of labels assigned to the pixels of the image illustrated in FIG. 7A in accordance with a watershed transform based image segmentation process.

FIG. 7A is a diagrammatic view of an array 44 of devised gradient magnitude values at respective pixels of an illustrative image. FIG. 7B is a diagrammatic view of an array of labels assigned to the pixels of the image shown in FIG. 7A in accordance with a watershed transform based image segmentation process and a connected component re-labeling process based on 4-connectivity. In FIG. 7B, the labels B1 and B2 identify respective basins and the label W identifies the watershed pixels that were detected in the array 44.

Figure 8A:
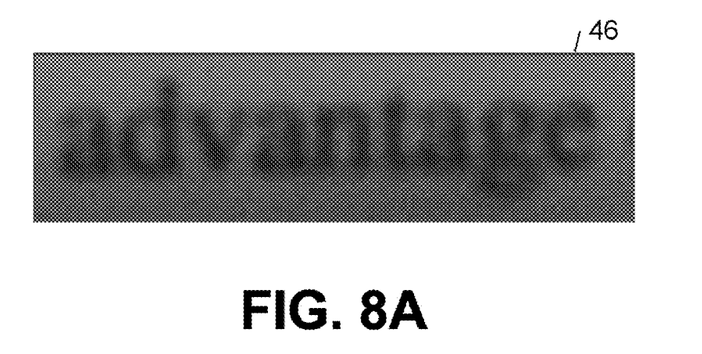
FIG. 8A is an example of an image containing text.
Figure 8B:
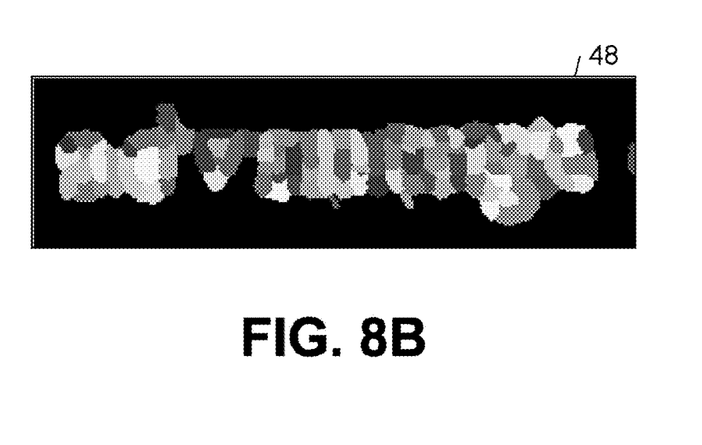
FIG. 8B is a grayscale image showing different labels that were assigned to the pixels of the image of FIG. 8A in accordance with an embodiment of the segmentation process in the method illustrated in FIG. 3.

FIG. 8A illustrates an example of an image 46 containing text (i.e., the word "advantage") and FIG. 8B illustrates a grayscale image 48 of the resulting (numbered) labels that were assigned to the pixels of the image 46 in accordance with an embodiment of the segmentation process of block 34 of FIG. 3.

In some embodiments, after the pixel connectivity analysis has been performed, the watershed pixels are merged with the neighboring region with the largest label number to produce a segmentation of the pixels of the image 16 into a final set of identified regions or groups.

As illustrated in block 36 of FIG. 3, pixels are segmented into background and non-background pixels. In some embodiments, the segmentation process illustrated in block 36 of FIG. 3 is a two-step process, where an initial background region is identified, then other regions of the image are examined and designated as background if they meet certain criteria. For example, the segmentation module 12 generates a classification record that labels as background pixels ones of the pixels segmented into one of the identified regions or groups determined to be largest in size and labels as non-background pixels ones of the pixels segmented into any of the identified groups except the largest group. The largest group may be identified in a variety of different ways.

In some embodiments, the largest group is determined by selecting the group having the largest number of pixels. For example, in certain embodiments, the segmentation module 12 records in the classification record a first binary value (for example, "1" or "white") for each of the pixels segmented into the largest group and second binary value (for example, "0" or "black") for each of the pixels segmented into any of the groups except the largest group.

In other embodiments, the initial background region is identified based on average luminance. The region with the largest value of a metric $S_y$ is identified as the background region. In general, $S_y$ is based on the average luminance of the region under examination. For example, $S_y$ is computed as follows in some embodiments:

$$S_y = N \cdot \bar{y}/255.0 + k \cdot A$$

where N is the number of pixels in the region under examination, A is the area (in pixels x pixels) of a bounding box of the region, $\bar{y}$ is the average luminance of the region, and k is a real number determined empirically. For example, k=0.5 in some embodiments. For a special case where k=0, the area of the bounding box A is discounted. For grayscale images, the average luminance value $\bar{y}$ is the average of all the pixel values of the region. For a color R,G,B image, the average luminance value $\bar{y}$ is the weighted sum of the average r,g,b values; for example:

$$\bar{y} = 0.2125 \cdot \bar{r} + 0.7154 \cdot \bar{g} + 0.0721 \cdot \bar{b}.$$

where the weighting factors are empirically determined.

In other embodiments, the background region is identified based on the area having a color closest to a reference color. Accordingly, the region with the largest value of a metric $S_c$ with a reference color c is identified as the background region. For example, $S_c$ is calculated as follows in some embodiments:

$$S_c = P_c + k \cdot A$$

where A and k are the same as described above—A is the area (in pixels x pixels) of a bounding box of the region and k is a real number determined empirically. $P_c$ is a sum of a weighted pixel count.

In general, $$P_c = \sum_{p \in R} f(d_p)$$

where $d_p$ is a color distance between a pixel p and the reference color c, f is a monotonically decreasing function with the maximum value of 1 at the origin, and R represents a region. The reference color is specified as $c=y_0$ for a grayscale image and $c=(r_0, g_0, b_0)$ for R,G,B color images.

For grayscale images, $$d_p^2 = (y_p - y_0)^2$$

and for R,G,B color images, $$d_p^2 = (r_p - r_0)^2 + (g_p - g_0)^2 + (b_p - b_0)^2$$

Example forms of the function f include $$f(d) = \exp(-d^2/\sigma^2)$$

where σ is a real number parameter, determined empirically, that controls the shape of the Gaussian curve; and $$f(d) = \begin{cases} (255 - |d|)/255, & |d| \leq 255 \\ 0, & \text{otherwise.} \end{cases}$$

The pixels in the identified background region are labeled as background pixels. In accordance with some embodiments, after the initial background region is identified, the other regions in the image are examined and added to the background classification if a region under examination meets certain criteria and if the region does not merge into any one of the regions already labeled as being a background region. To check if a region k will merge into an existing background region, in one embodiment, each pixel of the region k is examined to determine how many of the four neighboring pixels are already classified as background pixels.

For example, additional regions are classified as background if the number of pixels in the region is above some predetermined threshold and if the average color of the region is close to the average color of the initial background region. In one embodiment, after initially identifying background region, another region is added to the background classification if the number of pixels in the region is greater than thirty times the image width, and if the distance of the average color of the region c and the average color of the initial background region $\bar{c}_0$ is less than a set threshold cth.

Figure 8C:
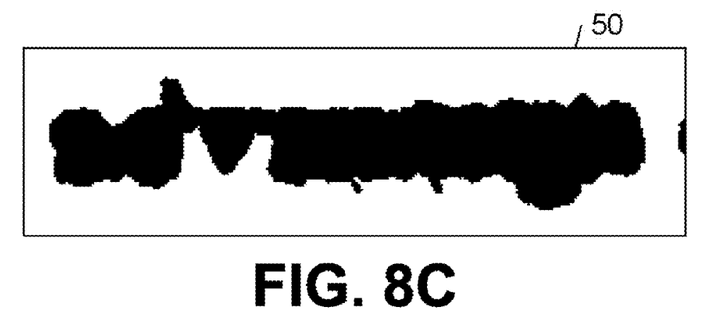
FIG. 8C is an example of a classification record in the form of a binary segmentation map generated from the grayscale image of FIG. 8B in accordance with an embodiment of the classification record generation process in the method illustrated in FIG. 3.

FIG. 8C illustrates an example of a classification record generated for the image 46 (see FIG. 8A) in the form of a binary segmentation map 50 that was generated from the grayscale image 48 (see FIG. 8B) in accordance with an embodiment of the classification record generation process of block 36 in FIG. 3. In the binary segmentation map 50, the black pixels represent object pixels that were detected in the image 46 (see FIG. 8A) and the white pixels represent background pixels that were detected in the image 46.

Referring back to FIG. 8B, the watershed transform based segmentation performed in block 34 of FIG. 3 tends to over-segment the text characters appearing in images 40, 46. As shown in FIG. 8C, however, the background pixels in these images 40, 46 readily can be identified as the largest connected component in the pixel labels assigned by the watershed transform segmentation process in spite of such over-segmentation.

Figure 9:
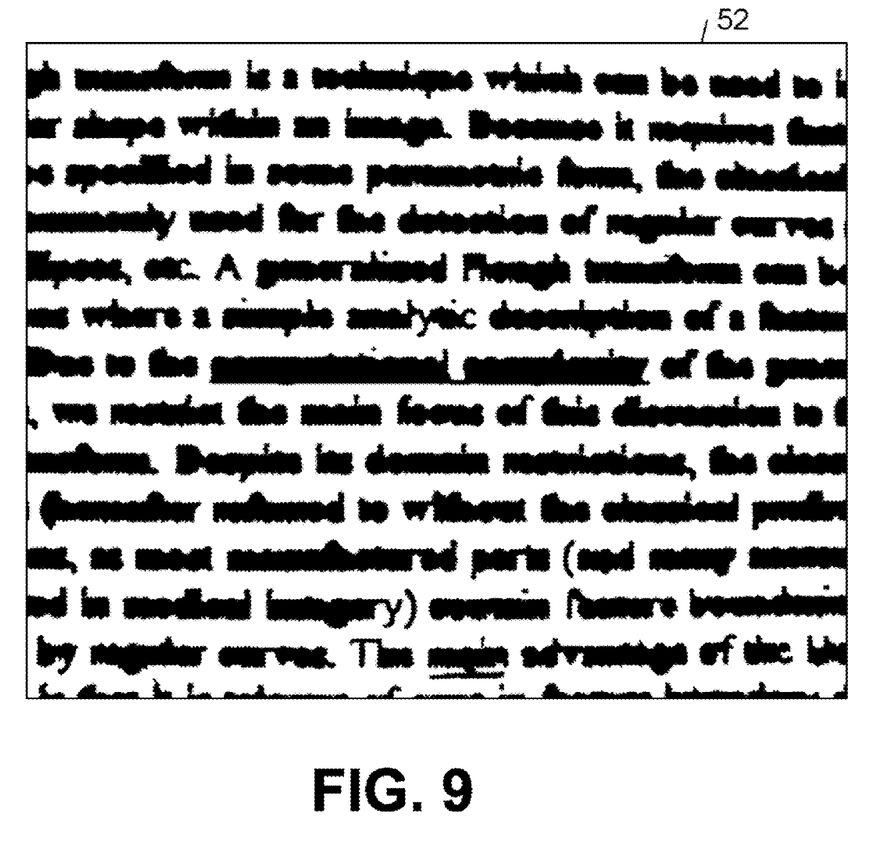
FIG. 9 illustrates an example of a classification record in accordance with embodiments of the present invention.

FIG. 9 illustrates an example of a graphical representation of a classification record that was generated for the image 40 (see FIG. 4) in the form of a binary segmentation map 52 in which black pixels represent object pixels detected in the image 40 and white pixels represent background pixels detected in the image 40.

Figure 10:
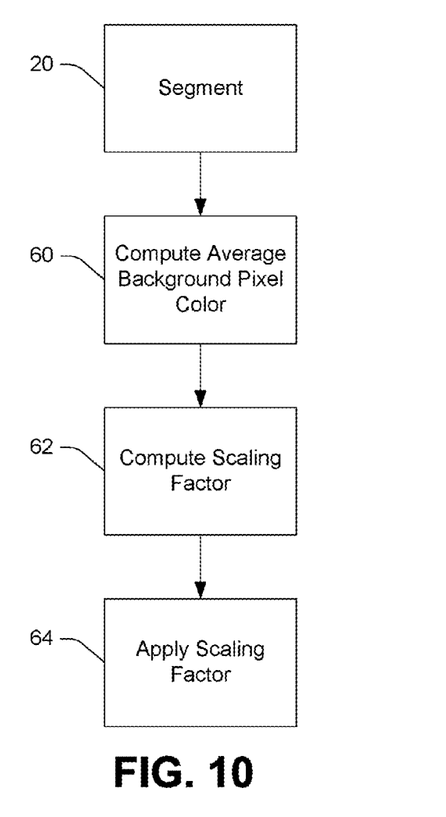
FIG. 10 is a flow diagram illustrating further aspects of an image enhancement method in accordance with embodiments of the present invention.

Referring back to FIG. 2, in blocks 22 and 24, background pixels were compared to white (original white background assumed) and based on the comparison, scaling factors are calculated. FIG. 10 illustrates an embodiment where the average color of the background pixels is further computed and used to calculate the scaling factors. Accordingly, after segmenting the pixels of the image into background and non-background pixels in block 20, the average color of the background pixels is determined in block 60.

If sRGB is the color space associated with the input color image 16, the sRGB image 16 is first converted to linear RGB in the range of [0,1]. This conversion can be done with look-up tables for ease of computation. The color correction module 14 then computes the average color $(\bar{R}_0, \bar{G}_0, \bar{B}_0)$ of the background pixels from the linear RGB image with the background segmentation.

In block 62, the color correction module 14 compares the average background color to white and computes scaling factors $(s_R, s_G, s_B)$ such that $(\bar{R}_0 \cdot s_R, \bar{G}_0 \cdot s_G, \bar{B}_0 \cdot s_B) = (y,y,y)$. For example, let $y = \min(\bar{R}_0, \bar{G}_0, \bar{B}_0)$, and then $s_R = y/\bar{R}_0$; $s_G = y/\bar{G}_0$; $s_B = y/\bar{B}_0$. One of the three scaling factors must be 1 and thus need not be computed. In certain embodiments, look-up tables $LUT_R[256]$, $LUT_G[256]$, $LUT_B[256]$ are constructed, which cascade two conversions of color scaling $(\bar{R}_0 \cdot s_R, \bar{G}_0 \cdot s_G, \bar{B}_0 \cdot s_B)$ and linear RGB to sRGB. The three look-up tables are then respectively applied to the R,G,B channels of the linear RGB image in block 64 to provide the color-corrected image 18.

Figure 11:
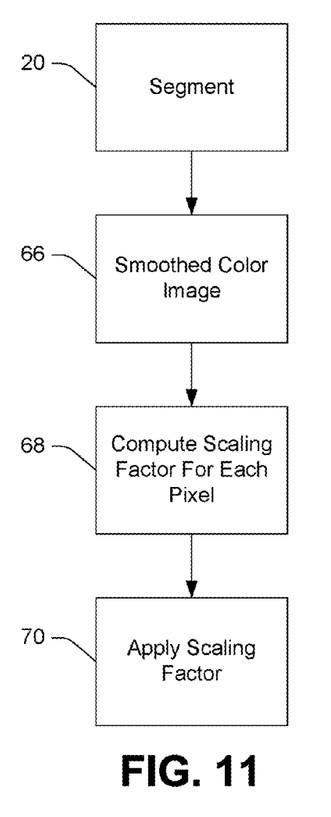
FIG. 11 is a flow diagram illustrating further aspects of an image enhancement method in accordance with embodiments of the present invention.

FIG. 10 illustrates a "global" approach, where one set of scaling factors is computed based on the average background color, and then applied to all the pixels of the image. This applicable, for example, when the entire background of the image 16 is fairly uniform, so a single set of scaling factors is effective to correct the entire image. FIG. 11 illustrates another embodiment, where a "local" approach is used for applying scaling factors. This is appropriate, for example, if the image discoloration varies from one part of the image to another.

In block 66, rather than computing the average background color, a "smoothed" color image is created by using the colors of the background pixels to estimate the colors of neighboring non-background pixels. The image can be converted to a YCrCb color space, and the colors for the non-background pixels may be estimated from the neighboring background pixels in a variety of different ways, including using interpolation methods and image impainting methods.

In block 68, scaling factors $(s_R, s_G, s_B)$ are computed for each pixel as compared to white in the manner described in accordance with block 62 of FIG. 10. In block 70, the scaling factors $(s_R, s_G, s_B)$ are applied to the pixels in the linear RGB image, and the scaled linear RGB pixel values can then be converted to an sRGB image.

Figure 12:
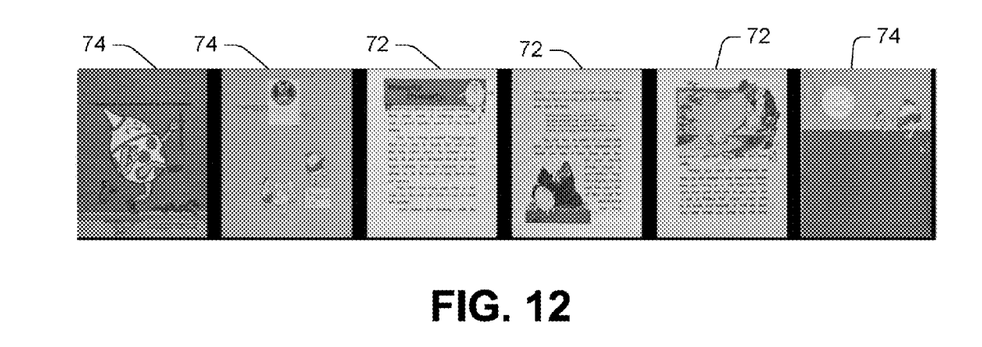
FIG. 12 illustrates a plurality of images of pages of a book.

In the discussion of methods disclosed thus far, it was assumed that the image 16 includes a predominantly white background. For a single image, or a homogenous set of images, this is likely a good assumption. However, there are instances where this assumption does not hold true. For instance, there are often certain pages in a book, such as the front and back covers and even some internal pages, that do not have a predominantly white background. While such pages often exist, the majority of pages in a book typically have a similar background color that originally was white. FIG. 12 illustrates images of six pages from a book. Three of the pages 72 each have a lighter background that is assumed to have originally been white. The other three pages 74 (front and back covers and one interior page) have darker backgrounds.

Figure 13:
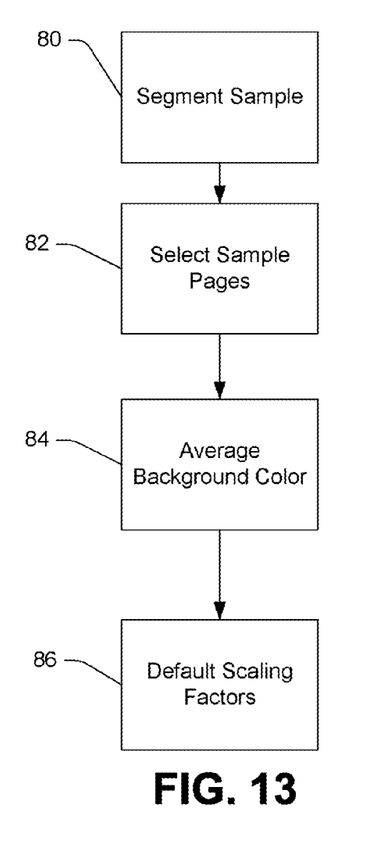
FIG. 13 is a flow diagram illustrating an image enhancement method in accordance with embodiments of the present invention.

An embodiment is disclosed where a set of images, such as pages of a book, are enhanced. It is assumed that the majority of the book pages have a background color that originally was white or is intended to be white. However, as illustrated in FIG. 12, books likely include pages with non-white backgrounds. In the disclosed embodiments, the book images or pages are processed in two passes. FIG. 13 illustrates example processes of the first pass, where a sample of pages from the book are segmented into background and non-background pixels in block 80. The sample can be some number of pages of the book, such as 50 pages or some percentage of the total number of pages in the book, for example.

In block 82, the sample pages are analyzed and certain ones of the sample pages are selected. The mean color of the background pixels of the selected pages is computed in block 84. The average color $(\bar{R}_0, \bar{G}_0, \bar{B}_0)$ is then used to compute scaling factors as disclosed in conjunction with block 62 of FIG. 10. In some embodiments, sample pages are selected in block 82 of FIG. 13 based on predetermined criteria. Generally, sample pages having a background region that originally was white are used to compute the average background color, which is used as the basis for the scaling factors. For example, in certain embodiments the analysis of sample pages includes computing the total number of background pixels in a given sample page and the number of background pixels in the margin region of the given sample page. The margin region is the rectangular strip surrounding the image, and can have a predefined width. In one implementation, the margin region is defined as having a width of 30 pixels. Additional calculations used in the selection process can include the average luminance value and the average R,G,B values of the page.

For selected pages with average background color $\{(\bar{r}_0,\bar{g}_0,\bar{b}_0), \ldots, (\bar{r}_n,\bar{g}_n,\bar{b}_n)\}$, $r_m$ is the median of $\{\bar{r}_0, \ldots, \bar{r}_n\}$, $g_m$ is the median of $\{\bar{g}_0, \ldots, \bar{g}_n\}$, and $b_m$ is the median of $\{\bar{b}_0, \ldots, \bar{b}_n\}$.

The median color $(r_m, g_m, b_m)$ of the average background color is then computed for pages satisfying certain conditions. For example, the median color $(r_m, g_m, b_m)$ is computed 1. if the background pixels exceed some predefined percentage of the entire image (for example, background exceeds 15% of the entire image) OR if the background pixels in the margin area exceed some predefined portion of the entire margin area (for example, background pixels in margin exceeds 50% of the total margin area); AND
2. if the average luminance is above some predefined level (for example, luminance is above 140).

Figure 14:
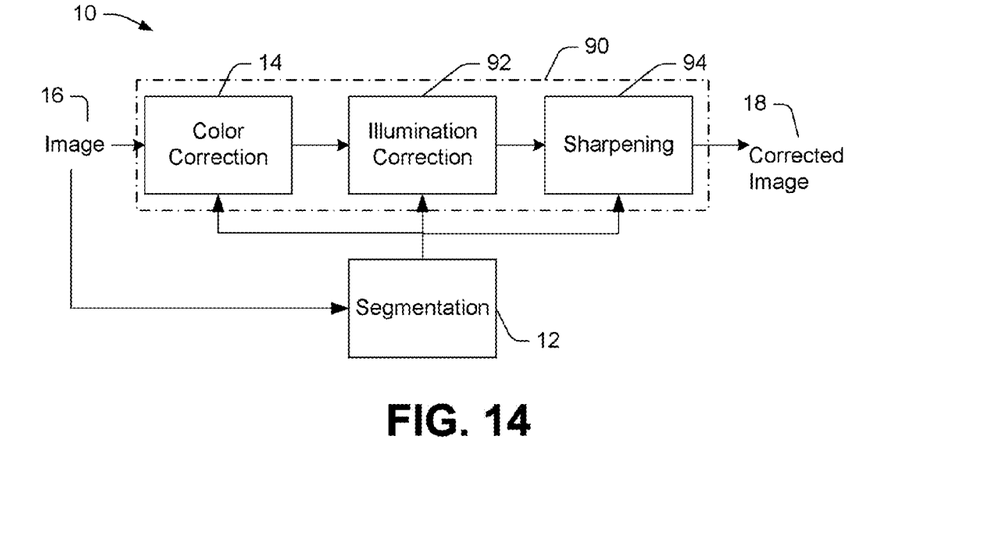
FIG. 14 is a block diagram conceptually illustrating further aspects of the image enhancement system illustrated in FIG. 1.

The median color $(r_m, g_m, b_m)$ is used to calculate default scaling factors for the R,G,B channels as described above in conjunction with FIG. 10. Once the default scaling factors have been calculated based on the selected sample pages, each page of the book (or other set of images) is enhanced. In the system 10 illustrated in FIG. 1, the color correction module 14 enhanced the image 16 by correcting the color of the segmented image. FIG. 14 illustrates further aspects of the system 10, which in which a segmentation module 90 includes, in addition to the color correction module 14, an illumination correction module 92 and a sharpening module 94. In certain embodiments, after calculating the average color and scaling factors based on the selected sample pages, the enhancement module 90 enhances each image.

Figure 15:
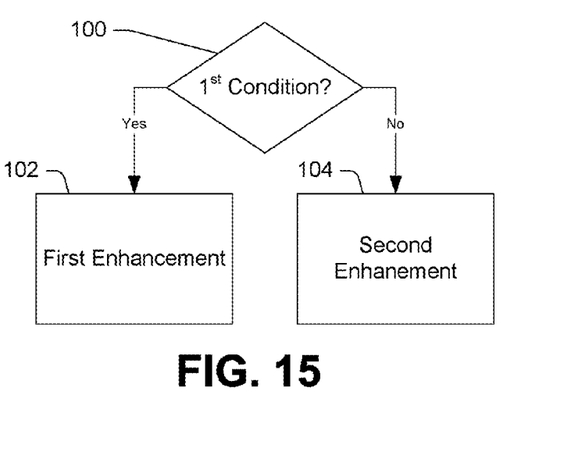
FIG. 15 is a flow diagram illustrating an image enhancement method in accordance with embodiments of the present invention.

FIG. 15 is an embodiment of a second pass process where the entire set of images is separated into two classes. Essentially, if the image under consideration satisfies a first condition or set of conditions, a first enhancement process is applied to the image. Thus, in block 100, the image is analyzed and if the image under consideration meets a first condition, the first enhancement process is applied to the image in block 102. If the image does not meet the first condition, a second enhancement process is applied to the image in block 104. In certain embodiments, the first condition requires that the image has a background that was originally white.

In accordance with some embodiments, the analysis of each image in block 100 includes the luminance-based segmentation process disclosed above, where the region having the largest value of a metric $S_y$ is identified as the background region.

The identified background pixels of the page under consideration are analyzed (block 100) to determine whether the background of the page under consideration originally was white. In an embodiment, the conditions of block 100 include determining whether the average color $(\bar{r}_k, \bar{g}_k, \bar{b}_k)$ of the background pixels for the page under consideration k is within a predefined distance of the median background color $(r_m, g_m, b_m)$ determined in the first pass (block 84 of FIG. 13). The color distance can be computed in R,G,B or in other color spaces. A Euclidian distance d in R,G,B space takes the form of:

$$d = \sqrt{(\bar{r}_k - r_m)^2 + (\bar{g}_k - g_m)^2 + (\bar{b}_k - b_m)^2}$$

In certain embodiments, the condition of block 100 is considered met if the distance d is below a predetermined threshold (for example, less than 70); AND if the background pixels exceed some predefined percentage of the entire image (for example, background exceeds 15% of the entire image); OR if the background pixels in the margin area exceed some predefined portion of the entire margin area (for example, background pixels in margin exceeds 50% of the total margin area). If these criteria are met in block 100, the first enhancement process is applied to the image in block 102

For example, in certain embodiments, the first enhancement process includes applying the default scaling factors calculated in block 86 of FIG. 13 to the image in the manner described in conjunction with FIG. 10. Additionally, the illumination correction and sharpening modules 92,94 can be employed to further enhance the image.

For example, in the first enhancement process, the illumination correction module 92 is operable to correct for non-uniform illumination in the given image 16. In some embodiments, the illumination correction is based on the following image formation model:

$$I(x,y) = R(x,y) \cdot L(x,y)$$

where I(x, y) is the measured intensity value, R(x, y) the surface reflectivity value, and L(x, y) is the illuminant value at pixel (x,y) of the image 16, respectively.

In accordance with this model, the illuminant values of background pixels are assumed to be proportional to the luminance values of the pixels. The estimated illuminant values $\hat{L}(x, y)$ for the background pixels are obtained, for example, by converting the image 16 into a grayscale color space or the YCrCb color space and setting the estimated luminant values $\hat{L}(x, y)$ to the grayscale values or the luminance values (Y) of the background pixels (x,y) in the converted image. The illuminant values for the non-background pixels may be estimated from the estimated illuminant values of the neighboring background pixels in a variety of different ways, including using interpolation methods and image impainting methods.

In some embodiments, the illumination-corrected pixel values E(x, y) of the enhanced image are estimated from ratios of spatially corresponding ones of the pixel values of the image 16 to respective tone values that are determined from the estimated illuminant values in accordance with the following:

$$E(x, y) = \hat{R}(x, y) = s \cdot \frac{I(x, y)}{T(\hat{L}(x, y))}.$$

where s is a scale factor, I(x, y) is the value of pixel (x,y) in the image 16, $\hat{L}(x, y)$ is the illuminant value estimated for pixel (x,y), and $T((\hat{L}(x, y))$ is a function that maps the estimated illuminant value to a respective tone value. In one exemplary embodiment in which pixel values range from 0 to 255, the scale factor s is set to 255. The tone mappings corresponding to the function $T((\hat{L}(x, y))$ typically are stored in a lookup table (LUT).

In some embodiments, the tone mapping function $T((\hat{L}(x, y))$ maps the estimated illuminant values to themselves (i.e., $T((\hat{L}(x, y)) = \hat{L}(x,y))$). In these embodiments, the resulting enhanced image corresponds to an illumination corrected version of the original image 16.

In some embodiments, the tone mapping function incorporates an unsharp-masking-like contrast enhancement that is applied to the object region (i.e., non-background region) that are identified in the segmentation process. In some of these embodiments, the tone mapping function that is used for the object region pixels is defined as follows:

$$T(\hat{L}(x,y)) = s \cdot \begin{cases} t(\hat{L}(x,y)/t)^{\gamma}, & 0 \leq \hat{L}(x,y) \leq t \\ 1 - b((1-\hat{L}(x,y))/t)^{\gamma}, & t \leq \hat{L}(x,y) \leq 1 \end{cases}$$

where s=255 for 8-bit images, b=t$^{\gamma}$(1−t)$^{1-\gamma}$ and t=Ī/s the normalized mean luminance value of the image. In these embodiments, in response to determinations that the corresponding estimated illuminant values are below a illuminant threshold value, the image enhancement module 90 sets pixel values of the enhanced image darker than spatially corresponding ones of the pixel values of the given image. In addition, in response to determinations that the corresponding estimated illuminant values are above the illuminant threshold value, the image enhancement module 90 sets pixel values of the enhanced image lighter than spatially corresponding ones of the pixel values of the given image.

In other ones of these embodiments, the tone mapping function that is used for the non-background (i.e., object region) pixels is defined as follows:

$$T(\hat{L}(x,y)) = s \cdot \begin{cases} t(\hat{L}(x,y)/t)^{\gamma}, & 0 \leq x \leq t \\ \hat{L}(x,y), & t \leq x \leq 1 \end{cases}$$

In some embodiments, the first enhancement process includes the sharpening module 94 applying unsharp masking selectively to target object regions, (for example, text regions) that are identified in the segmentation process. In some of these embodiments, the pixel values of the object regions ($E_{OBJECT(x,y)}$) of the enhanced image are computed by the selective filter defined in the following equation (which incorporates an unsharp masking element in the illumination correction filter defined above):

$$E_{OBJECT}(x,y) = s \cdot \frac{(\alpha+1) \cdot I(x,y) - \alpha \cdot \hat{L}(x,y)}{T(\hat{L}(x,y))}$$

where α is an empirically determined parameter value that dictates the amount of sharpening.

In some embodiments, the pixel values of the object regions ($E'_{OBJECT(x,y)}$) of the enhanced image are computed by applying the selective filter defined in the following equation to the pixel values ($E_{OBJECT(x,y)}$) generated by the selective sharpening filter defined above:

$$E'(x,y) = (\beta+1) \cdot E_{OBJECT}(x,y) - \beta \cdot G[E_{OBJECT}]$$

where G[ ] represents a Gaussian smoothing filter and the parameter β represents the amount of sharpening. In some embodiments, the size (w) of the Gaussian kernel and the amount of sharpening β are determined from the following equations, respectively:

$$w = \begin{cases} w_{min}, & \text{if } (g_{max} > g_H) \\ [w_{min}(g_{max}-g_L) + w_{max}(g_H-g_{max})]/(g_H-g_L), & g_L \leq g_{max} \leq g_H \\ w_{max}, & \text{if } (g_{max} < g_L) \end{cases}$$

$$\beta = \begin{cases} \beta_{min}, & \text{if } (g_{max} > g_H) \\ [\beta_{min}(g_{max}-g_L) + \beta_{max}(g_H-g_{max})]/(g_H-g_L), & g_L \leq g_{max} \leq g_H \\ \beta_{max}, & \text{if } (g_{max} < g_L) \end{cases}$$

where [$w_{min}$, $w_{max}$] is an empirically determined parameter value range for the window size, [$\beta_{min}$, $\beta_{max}$] is an empirically determined parameter value range for the amount of sharpening, and [$g_L$, $g_H$] is the low and high thresholds of the sharpness, $g_{max}$ is the maximum gradient magnitude value determined in block 30 in the method illustrated in FIG. 3. In some embodiments, the Gaussian smoothing filter G[ ] may be replaced by a different type of smoothing filter, such as an averaging filter for example.

If the first condition or conditions are not met in block 100, the second enhancement process is applied in block 104. In some embodiments, the second enhancement process includes applying the default scaling factors (block 86 of FIG. 13) to the image. Further, in some of these embodiments, the illumination correction and sharpening modules 92, 94 apply a global brightness and contrast adjustment and a non-selective unsharp-masking.

In one embodiment, the illumination correction module 92 is operable to compute a brightness adjustment (ΔI) by computing a luminance histogram (h[0:255]) from the image, and finding a maximum index ($i_{max}$) such that h[$i_{max}$]>α, where α is an empirically determined parameter value (for example, α=200). If the maximum index is less than a predefined parameter value β ($i_{max}$<β), the brightness adjustment ΔI=0, else ΔI=λ(255−$i_{max}$), where λ is a scaling factor (for example, 0.25).

In some of these embodiments, a look-up table for is computed as follows to apply the brightness adjustment:

Let $i_{high}$=255−ΔI; $i_{mid}$=$i_{high}$/2; y=I+ΔI; x=2(y−$i_{mid}$)/$i_{high}$ $$LUT_i = \begin{cases} 255, & y \geq i_{high} \\ 127.5 \cdot [2 - (1-x)^y], & i_{mid} < y < i_{high} \\ 127.5 \cdot (1-x)^y, & 0 < y \leq i_{mid} \\ 0 & y == 0 \end{cases}$$

where γ=1+0.02·ΔC, and ΔC is a contrast adjustment (for example, ΔC=30). The look-up table is then applied to each of the R,G,B channels independently.

Embodiments of the image processing system 10 may be implemented by one or more discrete modules (or data processing components) that are not limited to any particular hardware, firmware, or software configuration. In the illustrated embodiments, the modules may be implemented in any computing or data processing environment, including in digital electronic circuitry (for example, an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions (for example, computer-readable code, such as computer software) for implementing the methods that are executed by the embodiments of the image processing system 10, as well as the data it generates, are stored in one or more computer-readable media. Storage devices suitable for tangibly embodying these instructions and data include all forms of computer-readable memory, including, for example, RAM, semiconductor memory devices such as EPROM, EEPROM, and flash memory devices, magnetic disks such as internal hard disks and removable hard disks, magneto-optical disks, DVD-ROM/RAM, CD-ROM/RAM, etc.

In general, embodiments of the image processing system 10 may be implemented in any one of a wide variety of electronic devices, including desktop and workstation computers, video recording devices and digital camera devices. Due to its efficient use of processing and memory resources, some embodiments of the image processing system 10 may be implemented with relatively small and inexpensive components that have modest processing power and modest memory capacity. As a result, these embodiments are highly suitable for incorporation in compact camera environments that have significant size, processing, and memory constraints, including but not limited to handheld electronic devices (a mobile telephone, a miniature still image or video camera, etc.), pc cameras, and other embedded environments.

Figure 16:
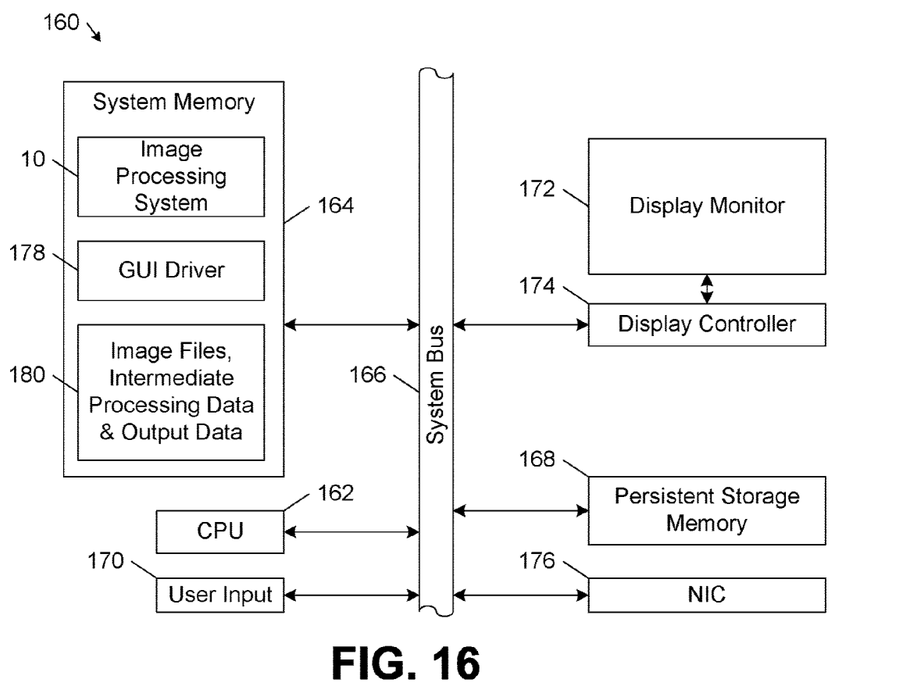
FIG. 16 is a block diagram illustrating an apparatus incorporating an embodiment of the image processing system illustrated in FIG. 1.

FIG. 16 illustrates an embodiment of a computer system 160 that incorporates any of the embodiments of the image processing system 10 described herein. The computer system 160 includes a processing unit 162 (CPU), a system memory 164, and a system bus 166 that couples processing unit 162 to the various components of the computer system 160. The processing unit 162 typically includes one or more processors, each of which may be in the form of any one of various commercially available processors. The system memory 164 typically includes a read only memory (ROM) that stores a basic input/output system (BIOS) that contains start-up routines for the computer system 160 and a random access memory (RAM). The system bus 166 may be a memory bus, a peripheral bus or a local bus, and may be compatible with any of a variety of bus protocols, including PCI, VESA, Microchannel, ISA, and EISA. The computer system 160 also includes a persistent storage memory 168 (a hard drive, a floppy drive, a CD ROM drive, magnetic tape drives, flash memory devices, digital video disks, etc.) that is connected to the system bus 166 and contains one or more computer-readable media disks that provide non-volatile or persistent storage for data, data structures and computer-executable instructions.

A user may interact (for example, enter commands or data) with the computer 160 using one or more input devices 170 (a keyboard, a computer mouse, a microphone, joystick, touch pad, etc.). Information may be presented through a graphical user interface (GUI) that is displayed to the user on a display monitor 172, which is controlled by a display controller 174. The computer system 160 also typically includes peripheral output devices, such as speakers and a printer. One or more remote computers may be connected to the computer system 160 through a network interface card (NIC) 176.

As shown in FIG. 16, the system memory 164 also stores the image processing system 10, a GUI driver 178, and a database 180 containing image files corresponding to the image 16 and the enhanced image 18, intermediate processing data, and output data. In some embodiments, the image processing system 10 interfaces with the GUI driver 178 and the user input 170 to control the creation of the classification record and the enhanced image 18. In some embodiments, the computer system 160 additionally includes a graphics application program that is configured to render image data on the display monitor 172 and to perform various image processing operations on the images 16.

Figure 17:
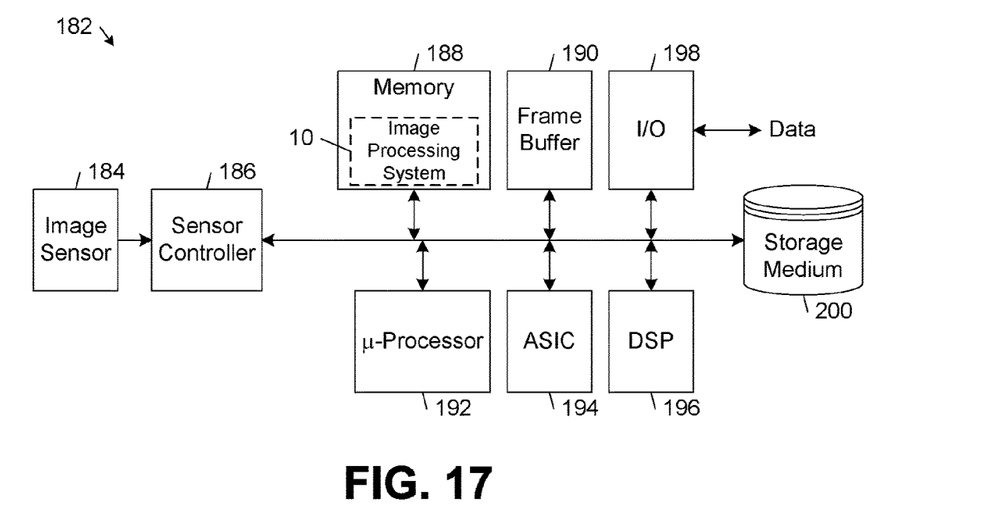
FIG. 17 is a block diagram illustrating an embodiment of an apparatus incorporating an embodiment of the image processing system illustrated in FIG. 1.

FIG. 17 illustrates an embodiment of a digital camera system 182 that incorporates, any of the embodiments of the image processing system 10 described herein. The digital camera system 182 may be configured to capture one or both of still images and video image frames. The digital camera system 182 includes an image sensor 184 (for example, a charge coupled device (CCD) or a complementary metal-oxide-semiconductor (CMOS) image sensor), a sensor controller 186, a memory 188, a frame buffer 190, a microprocessor 192, an ASIC (application-specific integrated circuit) 194, a DSP (digital signal processor) 196, an I/O (input/output) adapter 198, and a storage medium 200. In general, the image processing system 10 may be implemented by one or more of hardware and firmware components. In the illustrated embodiment, the image processing system 10 is implemented in firmware, which is loaded into memory 188. The storage medium 200 may be implemented by any type of image storage technology, including a compact flash memory card and a digital video tape cassette. The image data stored in the storage medium 200 may be transferred to a storage device (a hard disk drive, a floppy disk drive, a CD-ROM drive, a non-volatile data storage device, etc.) of an external processing system (for example, a computer or workstation) via the I/O subsystem 198.

The microprocessor 192 choreographs the operation of the digital camera system 182. In some embodiments, the microprocessor 192 is programmed with a mode of operation in which a respective classification record is computed for one or more of the captured images. In some embodiments, a respective enhanced image 18 is computed for one or more of the captured images based on their corresponding classification records.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by at least one processor of a computer system, the method comprising:
    segmenting, using a processor, pixels of an image into background pixels and non-background pixels;
    computing, using a processor, a color scaling factor based on the color of the background pixels compared to white; and
    applying, using a processor, the color scaling factor to the background pixels and the non-background pixels.

2. The method of claim 1, wherein computing the color scaling factor includes computing a color scaling factor for each pixel in the image.

3. The method of claim 1, wherein segmenting the pixels comprises:
    determining gradient magnitude values at respective pixels of the image;
    thresholding the gradient magnitude values with a global threshold to produce thresholded gradient magnitude values;
    segmenting the pixels into respective regions in accordance with a watershed transform of the thresholded magnitude values; and
    generating a classification record labeling each pixel as background pixels or non-background pixels.

4. The method of claim 3, wherein pixels are labeled as background pixels or non-background pixels in response to the size of the region containing the pixels.

5. The method of claim 3, wherein pixels are labeled as background pixels or non-background pixels in response to the luminance of the region containing the pixels.

6. The method of claim 3, wherein pixels are labeled as background pixels or non-background pixels in response to the distance between the color of the pixels in the region containing the pixels and a reference color.

7. The method of claim 3, wherein thresholding the gradient magnitude computing a histogram of the gradient magnitude.

8. The method of claim 1, wherein an sRGB colorspace is associated with the image, and further comprising converting the sRGB image to linear RGB.

9. The method of claim 1, wherein segmenting the pixels comprises segmenting the pixels of a plurality of images.

10. The method of claim 9, further comprising computing the color of the background pixels of selected ones of the plurality of images, and wherein computing the color scaling factor includes comparing the color of the background pixels to white.

11. The method of claim 10, wherein the plurality of images is a sample of images from a set of images, the method further comprising enhancing the set of images.

12. The method of claim 10, wherein applying the color scaling factor to the background pixels and the non-background pixels includes applying the color scaling factor to the pixels of the set of images, and further comprising:
 if a given image of the set of images meets a first condition, applying a first enhancement to the given image; and
 if the given image does not meet the first condition, applying a second enhancement to the given image.

13. The method of claim 12, further comprising segmenting pixels of the given image into background pixels and non-background pixels based on the color of the background pixels of the selected ones of the sample images.

14. A non-transitory computer readable storage medium storing instructions that when executed cause a processor to perform a method comprising:
 segmenting pixels of an image into background pixels and non-background pixels computing a color scaling factor based on the color of the background pixels compared to white; and
 applying the color scaling factor to the background pixels and the non-background pixels.

15. The computer readable storage medium of claim 14, wherein computing the color scaling factor includes computing a color scaling factor for each pixel in the image.

16. The computer readable storage medium of claim 14, wherein segmenting the pixels comprises segmenting the pixels of a plurality of images.

17. The computer readable storage medium of claim 16, further comprising computing the color of the background pixels of selected ones of the plurality of images, and wherein computing the color scaling factor includes comparing the color of the background pixels to white.

18. An apparatus, comprising:
 a memory for storing computer executable instructions; and
 a processing unit for accessing the memory and executing the computer executable instructions, the computer executable instructions comprising:
  a segmentation module operable to segment pixels of an image into background pixels and non-background pixels; and
  a color correction module operable to compute a color scaling factor based on the color of the background pixels compared to white, and apply the color scaling factor to the background pixels and the non-background pixels.

19. The apparatus of claim 18, wherein computing the color scaling factor includes computing a color scaling factor for each pixel in the image.

20. The apparatus of claim 18, wherein segmenting the pixels comprises segmenting the pixels of a plurality of images.

* * * * *